Jan. 31, 1939.   E. E. WEMP   2,145,381
CLUTCH
Filed April 23, 1932   4 Sheets-Sheet 1

INVENTOR.
Ernest E. Wemp
BY
Barnes, Kisselle & Laughlin
ATTORNEYS.

Jan. 31, 1939.  E. E. WEMP  2,145,381
CLUTCH
Filed April 23, 1932   4 Sheets-Sheet 2

INVENTOR.
Ernest E. Wemp
BY
Barnes, Kisselle & Laughlin
ATTORNEYS.

Jan. 31, 1939.  E. E. WEMP  2,145,381
CLUTCH
Filed April 23, 1932  4 Sheets-Sheet 3

INVENTOR.
Ernest E. Wemp
BY
Barnes, Kisselle & Laughlin
ATTORNEYS.

Jan. 31, 1939.  E. E. WEMP  2,145,381
CLUTCH
Filed April 23, 1932   4 Sheets-Sheet 4

INVENTOR.
Ernest E. Wemp
BY
ATTORNEYS.

Patented Jan. 31, 1939

2,145,381

UNITED STATES PATENT OFFICE 2,145,381

CLUTCH

Ernest E. Wemp, Detroit, Mich.

Application April 23, 1932, Serial No. 607,065

39 Claims. (Cl. 192—105)

This invention has to do with a clutch and particularly one arranged to effect clutching engagement between driving and driven members upon rotary movement of the parts and which may release the clutching engagement when the rotary action is low or when the parts come to a complete stop. More particularly, the invention is concerned with a clutch in which the clutching action may be centrifugally controlled, as for example, the type of clutch shown in my application Serial No. 592,301 filed on the 11th day of February, 1932.

Among the objects of the invention is the provision of a clutch involving an improved construction, including elements shiftable incident to centrifugal action, and parts shiftable by the physical effort of an operator, which together with other associated parts are incorporated in an assembly more or less of a unitary nature, and which assembly may be disposed and assembled in operating relation as regards a driving member and a driven member, as for example, the flywheel of an engine and a driven clutch disk. Another object of the invention is the provision of a clutch capable of operation by centrifugal action and by the physical effort of an operator, in which the application of physical effort is substantially the same as that required in the more or less conventional frictional clutch of the present day. Accordingly, the clutch may be controlled by an operator under certain conditions through the use of the ordinary clutch pedal lever. These and other objects become more apparent as the detailed description progresses.

In the accompanying drawings:

Fig. 6 is an enlarged view in illustration of some centrifugally controlled elements showing different positions which they may take, the same being illustrated in full and dotted lines.

Figures 1, 3, 5:
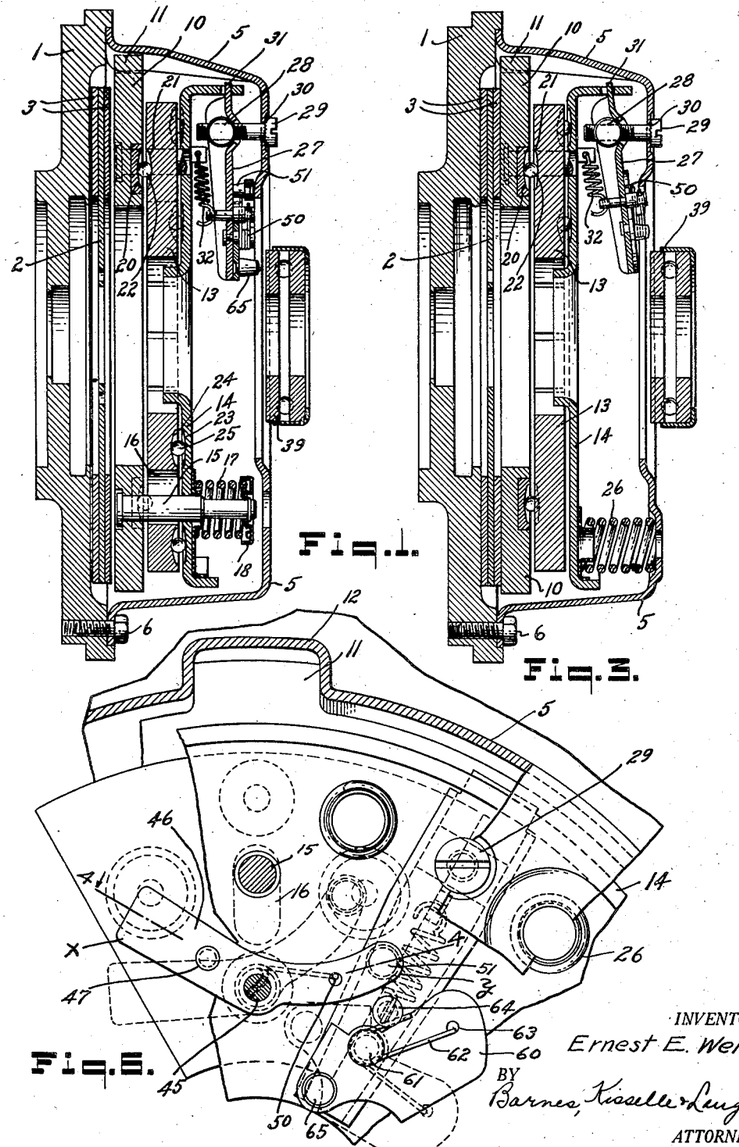
Fig. 1 is a sectional view taken through a clutch constructed in accordance with the invention showing the same in released position.
Fig. 3 is a sectional view of a portion of the clutch showing an engaged position which the clutch may take when the parts are at rest.
Fig. 5 is a rear elevational view with some parts cut away and illustrating some parts in different positions which they may take.
Figures 2, 10:
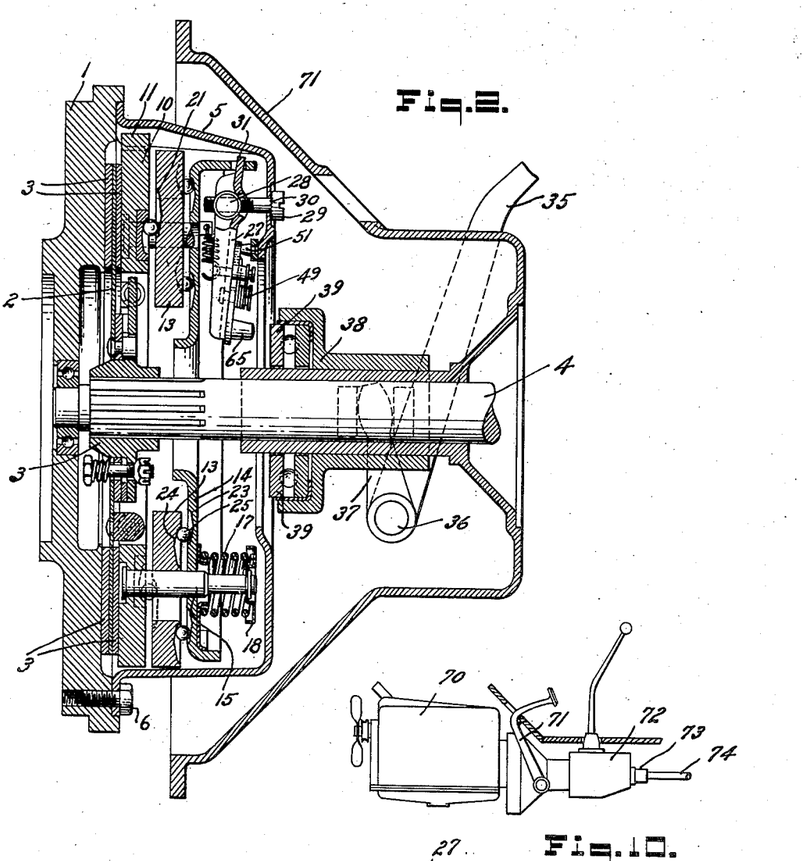
Fig. 2 is a similar sectional view showing the clutch in position engaged by centrifugal action.
Fig. 10 is a general schematic view showing an automobile engine with clutch housing transmission gear case, housing for free wheeling unit, and vehicle propeller shaft.

The invention is useful in a clutch for an automotive vehicle, and while the invention is not limited to use in an automotive vehicle, the same is shown and described in such environment. Accordingly, in Fig. 1 the flywheel of an engine is shown at 1 and this constitutes one of the driving members. A driven disk is shown at 2 and it may have facing material 3 designed to be packed into engagement between driving members much in the usual manner. As shown in Fig. 2, the driven disk 2 may be provided with a hub 3 mounted upon a driven shaft 4 which in turn may be journaled in the flywheel as shown.

A clutch cover plate is shown at 5, which may be attached to the flywheel by cap screws 6. Mounted in the cover plate are clutch elements including centrifugally controlled elements, manually operable elements, pressure springs and other associated parts preferably in such manner as to constitute a unit assembly so that in making an installation the cover plate with the assembled parts need only be attached to the flywheel.

A pressure ring is shown at 10 disposed in driving relation with the plate as by means of projections 11 fitting into depressions 12 in the cover plate (Fig. 6) but so mounted that it may shift axially. Disposed adjacent the pressure ring, and in the present instance, on the opposite side of the ring from the driven disk, are centrifugally controlled elements. These may take the form of segments, as shown at 13, and may be in suitable numbers as desired; in the present case there are six of such segments. These segments lie between the pressure ring 10 and a carrier plate or back plate 14. The three elements, to wit: the pressure ring, a centrifugal device comprising the six segments, and the carrier plate are operably united as by means of pins 15, there being one pin in the present instance, for each segment. As shown in Fig. 1, a pin 15 extends through the pressure ring and the pressure ring advantageously is countersunk for accommodating the head of the pin, and the pin extends through the segment in which it is accommodated by an aperture which will permit of the segment moving radially relative to the pin. Such an aperture is shown at 16, and as illustrated in Fig. 5 the aperture may be elongated in a radial direction. The pin projects through the carrier plate, as shown in Fig. 1, and associated with each pin there may be a coil spring 17 which may seat against the carrier plate at one end, and which is backed up by a retaining washer 18 fixed to the end of the pin. Where six segments are employed there may be six pins and six springs. The springs 17 are under some compression so that they serve to urge the pressure ring, segments and carrier plate toward each other.

When the segments shift radially outward incident to centrifugal force the same is resisted by the springs 17, and in this connection means are provided for effecting relative axial movement as between the pressure ring and carrier plate upon the shift of the segments. Such means may take the form of inclined surfaces and cooperating roller elements. In the pressure ring and in each segment there may be two normally matching recesses 20 and 21 with at least one of the recesses, and as shown herein, both of the recesses having inclined surfaces. The recesses are, generally speaking, in the form of inverted cones. Pocketed in the matching recesses is a roller element preferably in the form of a ball 22. As shown in Fig. 5, the two balls between each segment and the pressure ring are disposed in spaced relation and advantageously circumferentially spaced and disposed substantially on the center line of the segments. Similar matching recesses are provided between each segment and the carrier plate, as illustrated in Figs. 1 and 2, these recesses being shown at 23 and 24 pocketing balls 25. These are preferably spaced radially as shown in Fig. 5, advantageously located on a center radial line. This gives each segment a four-point contact between the pressure ring and carrier plate, thus stabilizing the segment.

When the several springs 17 function with little or no centrifugal action effective upon the segments, the pressure ring, segments and carrier plate are urged toward each other and the parts take a position as illustrated in Fig. 1, with the several balls seated substantially in the bottoms of the recesses. When the R. P. M. raises sufficiently to shift the segments radially outwardly, the parts may take the position as illustrated in Fig. 2. The several balls roll upon the inclined surfaces of the recesses and exert a wedging tendency so as to shift the pressure ring and carrier plate axially away from each other. The maximum radial outward movement of the segments is limited by the pins 15 as they strike the ends of the elongated slots, as is shown in Fig. 2, and it will be noted that the springs 17 are compressed.

Clutch packing springs are provided, as illustrated at 26, and they are backed up by the cover plate and act upon the carrier plate as illustrated in Fig. 3. As shown in Fig. 5, the pressure springs may be arranged in an annulus and in sufficient numbers which, in the present instance, are two springs for each segment, making a total of twelve springs.

Means are provided for manual operation of the device to retract some of the parts against the action of the packing springs to release the clutch. Such means may be constituted by clutch relieving levers 27, of which there may be three, each fulcrumed on an element 28 into which a screw threaded stud 29 is taken. The cover plate and the underneath side of the head of each stud 29 may be serrated, as shown at 30, for adjustment purposes. The end of each lever may project through an aperture in the carrier plate, as shown at 31. The levers may be further acted upon each by a relatively light spring 32 for preventing rattles and for maintaining the levers up against the fulcrum members and carrier plate. It will be noted that if the levers 27 be swung clockwise on their fulcrums, as Fig. 1 is viewed, that the carrier plate will be shifted in an axial direction away from the flywheel. Similarly, the segmental weights and pressure ring will be shifted with like movement.

Figure 9:
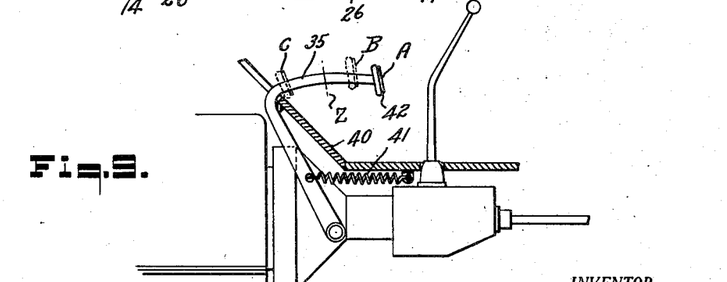
Fig. 9 is a diagrammatic view illustrating clutch pedal movements.

As shown in Fig. 2, the levers may be acted upon by manual or physical effort of an operator through the means of the pedal lever 35 rockable around point 36; rocking with the lever may be a yoke 37 operatively associated with an axially shiftable element 38 which may be equipped with an antifriction bearing 39 for contact with the levers, or contact members associated with the levers. In Fig. 9 a diagrammatic lay-out of a clutch lever is shown in which view the toe boards of an automobile are illustrated at 40 with the lever 35 passing therethrough. The lever may normally be held retracted by a spring 41 and lie up against the toe boards or other suitable stop. In a conventional installation the pedal 42, when the clutch is engaged, is in position A. In the first movement of the pedal there is what is known as a lash movement from position A to substantially position B during which movement there is no action upon the clutch and the throw-out member 38 is shifting toward the clutch and takes hold of the levers when the pedal is substantially in position B. As the pedal is depressed the effective throw-out of the clutch takes place substantially from position B to position C, which is the final clutch-releasing position. The total amount of movement in an automotive vehicle is, for practical purposes, limited to about 6" divided in about an inch or inch and a half from position A to position B with the remaining portion from position B to position C. The distance from A to B depends upon the clearance of the throw-out member 39 and the point of contact thereof with the clutch throw-out levers. It is desirable to maintain this conventional set-up in the clutch lever; however, it will be appreciated that as the centrifugal members 13 shift incident to centrifugal action, the clutch throw-out levers will be rocked upon their fulcrums away from the bearing, and thus the relation between the levers and the throw-out member 39 in at rest and during running condition varies. As the description progresses it will be observed that means are provided for meeting this situation.

Figure 4:
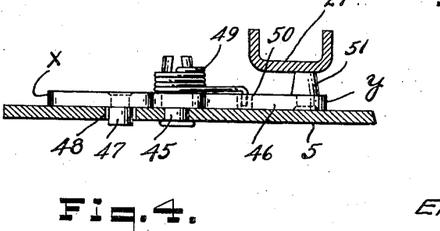
Fig. 4 is an enlarged sectional view taken substantially on line 4—4 of Fig. 6.
Figure 5:
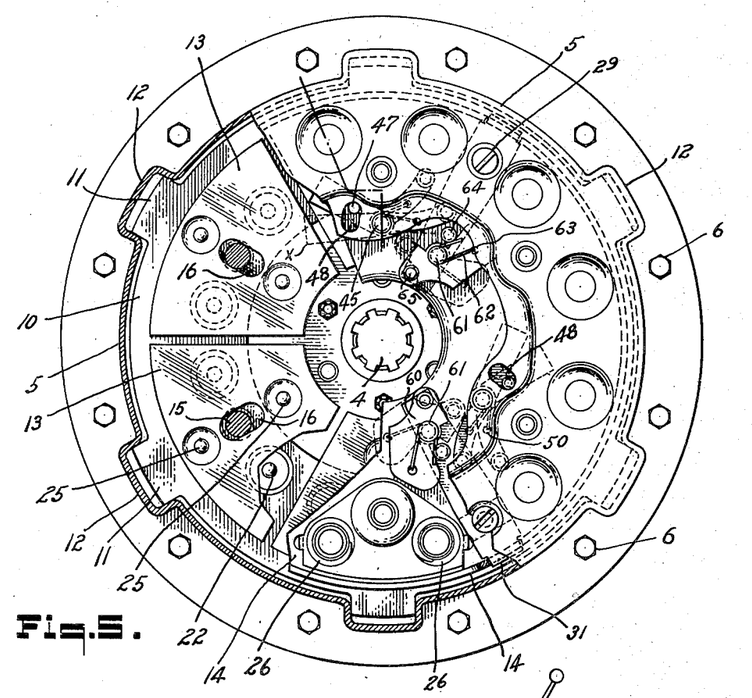

By reference to Fig. 3, it will be noted that the packing springs 26 urge the carrier plate, centrifugal members and pressure ring normally into clutching engagement with the driven disk so that the action of the centrifugal members would not serve to release the clutch in the absence of means to impede or limit the movement of the pressure ring toward the driven disk under action of the packing springs. Such a means is provided and may take the form of centrifugally controlled stop means such as illustrated in Figs. 4, 5 and 6. Pivotally mounted to the rear portion of the cover plate, as by means of a stud or rivet 45, is a member 46; the pivotal movement may be limited by a stud 47 working in a slot 48 in a cover plate. A torsion spring 49 may have one end connected to the stud 45 and its other hooked into an aperture 50 in the member 46. One end of the member 46 may carry a stud or an abutment device 51. The end X of the member 46 (Fig. 6) is of such a weight as compared to the end Y that the end X shifts radially outwardly by centrifugal action. The stop member 51 is designed in one position of the member 46 to engage a clutch lever 27 after the manner shown in Fig. 4.

Where the clutch is provided with three releasing levers 27, three members 46 may be provided. When the parts are at rest, or in other words, not rotating, the torsion spring acts upon the member 46 to shift it to the position shown in the dotted lines of Fig. 6 in which position the stop 51 is out of the path of movement of the lever 27. When the parts are rotating centrifugal action rocks the member 46 against the action of the torsion spring and positions the member 46 to the full line position shown in Fig. 6.

Let it be assumed that the parts are operating with the engine idling at a speed, say of 400 R. P. M. At this speed the segmental clutch members 13 have not been acted upon by the centrifugal force to any substantial extent and remain substantially in the position shown in Fig. 1 with the clutch released. However, the members 46 are so arranged that at idling speed the centrifugal force is sufficient to shift them to the full line position, as illustrated in Fig. 6, in which position the stops 51 are in stopping position for the levers. Accordingly, as illustrated in Fig. 1, the levers are restrained from shifting counterclockwise. In other words, the springs 26 may be exerting force on the carrier plate and its assembled parts tending to shift the same toward the driven disk, but the parts are held substantially in the position illustrated in Fig. 1 as the stops 51 block the levers 27 from movement. Thus at idling speed the clutch remains disengaged. Upon acceleration of the engine sufficiently, the centrifugal members 13 shift, as illustrated in Fig. 2, and spread the carrier plate and pressure ring apart to the end that the pressure ring is urged up against the driven disk with the force depending upon the strength of the packing springs 26, and the clutch is engaged. In this action the levers 27 may move out of engagement with the stops 51, but the stops 51 remain in their stopping position by centrifugal action. If the engine be decelerated to idling speed the parts assume the position shown in Fig. 1 with the clutch disengaged. As a result, an operator may shift the gears of a transmission into low, accelerate the engine and get the vehicle under way, decelerate the engine thus automatically disengaging the clutch, shift the gears of the speed change transmission a second time, for example, into second gear, again accelerate the engine and increase the speed of the vehicle; deceleration of the engine a second time to idling speed will disengage the clutch and the gears may be shifted to third or high gear in the event that the transmission is a three-speed transmission, and again upon accelerating the engine the car is in normal operating condition.

The above operation assumes the inclusion in the combination of a free wheeling unit. As illustrated in Fig. 10, an internal combustion engine of an automotive vehicle is shown at 70, a clutch housing at 71, within which a clutch just described may be mounted, and a transmission gear case 72. To the rear of the transmission 72 there may be a free wheeling unit disposed in a housing 73 and extending therefrom is a propeller shaft 74. The free wheeling unit in the housing 73 is designed to permit the propeller shaft 74 to overrun the engine, and as well overrun the transmission. A number of known structures may be employed, as for example, a coil spring or so-called roller clutches employing cam surfaces which permit the engine to drive the propeller shaft 74 in one direction but permit the shaft 74, and likewise the vehicle, to overrun the engine. Accordingly, at any time the engine may be decelerated to the end that the centrifugal clutch may open whereupon the gear shift may be readily made. In fact, the gear shift may be made irrespective of whether or not the centrifugal clutch opens where a free wheeling unit is united. It is thought that no further description or showing is necessary of the structure of the free wheeling unit as these structures are well known to those versed in the art.

Suppose that the vehicle is brought to a stop and the engine shut off, and it is desirable to engage the clutch so that the compression of the engine may be used as a brake. The stops 51 are in the position shown in Fig. 1 for the reason that the levers 27 press against the stops 51 with sufficient force to prevent the light torsion springs 49 from shifting the members 46. The operator may now depress the lever 35 to shift the levers 27 slightly to move them out of frictional engagement with the stops 51, whereupon the torsion springs shift the members 46 to dotted line position as illustrated in Fig. 6. As the operator now releases the lever 35, the clutch levers 27 may swing further in a counterclockwise direction, as illustrated in Fig. 3, thus permitting the packing springs to shift the carrier plate assembly sufficiently to engage the clutch plate as shown. This action may be resorted to in the event it is necessary to start the engine by towing or pushing the vehicle. If the engine be again started the operator may depress the clutch pedal 35 and shift the levers 27 sufficiently to permit the stops 51 to shift into stopping position by centrifugal action so as to hold the clutch disengaged at idling speeds; or the stop may automatically resume stopping position by accelerating the engine sufficiently to shift the segments causing shift of the carrier plate and levers 27.

It will be immediately apparent that the spacing between the inner ends of the levers 27 and the clutch release bearing 39 is different in Figs. 1 and 3 and means are provided for compensating for this differential, and such means may also take the form of centrifugally controlled elements. Pivotally mounted upon each lever is a centrifugally controlled member 60 (Fig. 6) pivoted as at 61 acted upon by a torsion spring 62, one end of which is hooked into an aperture 63 in the member, and the other end of which reacts against a stud 64 on the lever. Each of these members has an abutment or stud device 65. The torsion spring normally holds the member 60 in the dotted line position of Fig. 6, in which position the stop 65 lies away from the inner end of the lever as shown. Centrifugal action shifts the member 60 to the full line position, at which time the abutment 65 is adjacent the end of the lever, as illustrated in Figs. 1, 2 and 6. Advantageously these members 60 are so arranged as to be shifted to the full line position when the engine is at idling speed, as for example, at about or below 400 R. P. M. Accordingly, when the mechanism is operating at idling speed the normal position of the parts 65 are as shown in Fig. 1, and they remain in this position so long as the parts are rotating, as for example, when the clutch is engaged in normal driving position, as illustrated in Fig. 2. When the parts come to rest, however, the studs 65 shift as illustrated by the dotted line position of Fig. 6, in which position the studs 65 are out of the position so that they cannot make contact with the bearing 39.

The reason for providing the studs 65 and associated parts is for maintaining the more or less conventional lever action, as illustrated in Fig. 9. Any time the operator desires to release the clutch even though it is engaged by centrifugal action, as shown in Fig. 2, the lever 35 may be depressed; as the lever moves from position A to position B the throw-out bearing shifts from the position shown in Fig. 2 substantially into contact with the studs 65, whereupon movement of the lever to position C shifts the clutch throw-out levers 27 to retract the carrier plate assembly including the pressure ring to release the clutch. However, if the studs 65 remained in their effective position, as illustrated in Fig. 1, at all times, the clutch could not be engaged when the parts are not rotating, for the reason that the throw-out bearing 39 would prevent the necessary counterclockwise motion of the levers as the throw-out bearing 39 cannot shift from left to right, as Fig. 1 is viewed, due to the fact that the lever 35 is stopped as shown in Fig. 9. However, when the parts are stopped from rotating the members 65 immediately shift by action of the centrifugal members 60 so that they are out of position, thus permitting the levers 27 to shift counterclockwise, as illustrated in Fig. 3. The clearance, as illustrated in Fig. 3, may be somewhat greater so that the clutch will not begin to release until after the pedal passed position B, but this is not as important as maintaining the conventional lever movement during normal operation.

In short, the throw-out bearing 39 and lever 35 may have movements corresponding to the conventional structure at the present time. The levers 27 may have substantially the conventional amount of lever movement during normal operation with the studs 65 in effective position so as to be acted upon in a conventional manner by the pedal. The studs serve as space filler elements. The levers need an increased movement to permit engagement of the clutch when the parts are at rest, as illustrated in Fig. 3, and at this time the studs 65 have been moved to ineffective position to permit of this increased movement of the levers 27 toward the clutch throw-out bearing 39 without changing the conventional lever and clutch throw-out bearing arrangement.

Accordingly, with the engine idling all parts are substantially in the position shown in Fig. 1 and the clutch is automatically engaged and disengaged entirely by centrifugal action, but capable of being disengaged and again engaged by physical or manual effort of an operator by substantially conventional clutch pedal movement. As soon as the parts stop rotating the members 65 shift to ineffective position thus permitting clutch engagement in at-rest position provided of course that the stops 51 are also in ineffective position which may be effected in a manner above described. As a result, the clutch may be engaged and disengaged manually by the operator during normal driving conditions, and during an at rest condition, by similar pedal movements substantially the same as conventional pedal movements of the present time, while at the same time an automatic clutch action may be obtained. The term "manually" is used broadly to mean physical effort.

Figure 7:
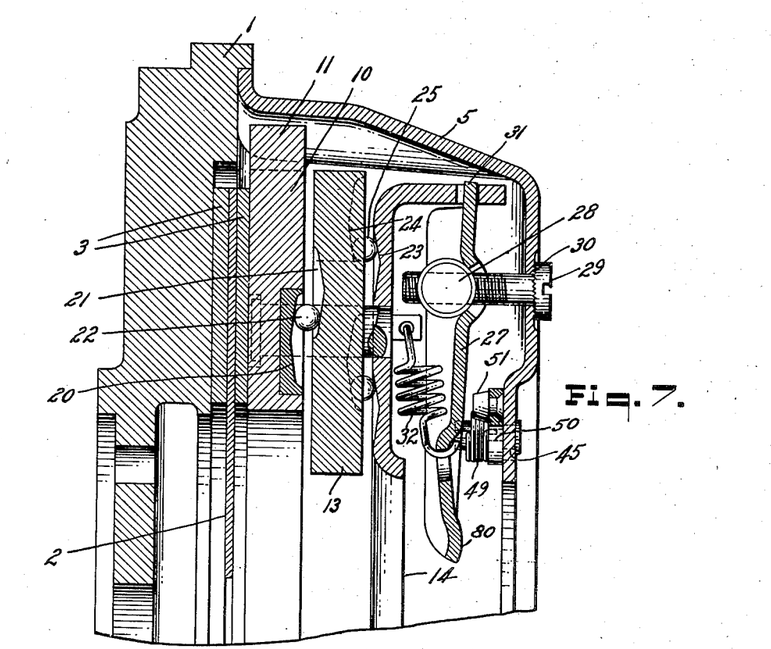
Fig. 7 is a sectional view of the modified form.
Figure 8:
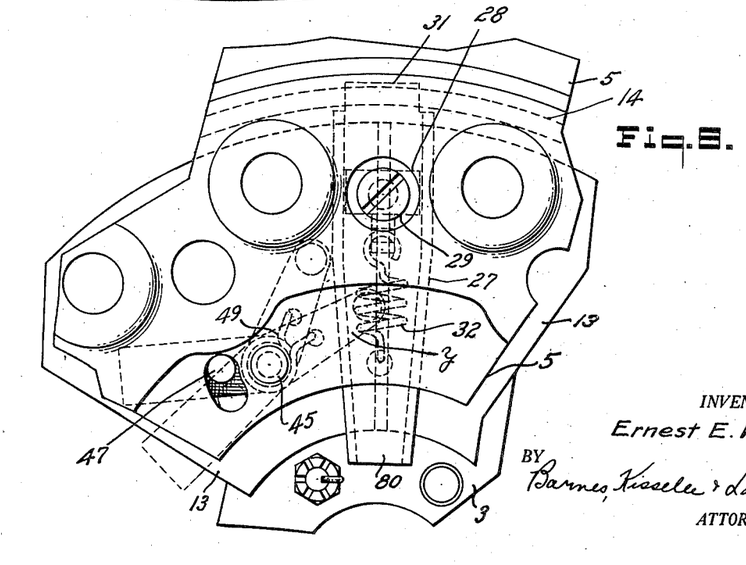
Fig. 8 is a rear end view of the structure shown in Fig. 7.

The general combination may be employed without utilizing the centrifugally controlled filler members 65 and this is illustrated in Figs. 7 and 8. In these views the parts are the same as the parts heretofore described, but the inner ends of the clutch levers 27 may be suitably shaped, as at 80, for direct contact with the throw-out bearing. It will be appreciated, of course, that while this is a workable structure yet the action of manually releasing the clutch takes place by a different action in the clutch throw-out lever. The parts necessarily should be set up to permit the release levers to shift sufficiently for clutch engagement in at rest position, as illustrated in Fig. 3. During operating conditions, the clutch levers will have been shifted away from the bearing 39. To move the bearing 39 into engagement with the ends 80 of the levers the pedal A would probably need to be shifted to a point, for example, substantially at position Z, Fig. 9, before there would be a releasing action of the clutch by manual operation. The parts in Figs. 7 and 8 have the same reference characters applied thereto as shown in the forms in Figs. 1 to 6.

The term "carrier plate" applied to the member 14 is a descriptive term used for convenience. This plate, when retracted by the levers also retracts the weights and the pressure ring and to this extent the plate actually carries these other members. However, this plate need not carry these other members in every respect; in fact, in the particular structure herein shown and described the carrier plate is supported or carried by the pressure ring by reason of the rings mounting in the cover plate.

I claim:

1. A clutch comprising in combination, a driving member, a carrier plate, a pressure ring arranged to move with the driving member, a driven disk, centrifugally controlled means supported in part by the carrier plate for shifting the pressure ring into clutching engagement with the driven disk, means limiting the movement of the said controlled means under centrifugal action, and operator controlled means for shifting the carrier plate, centrifugal means and pressure ring as a unit.

2. A clutch comprising in combination, a flywheel or the like, a driven disk, a clutch cover plate adapted for attachment to the flywheel, a pressure ring, a carrier plate, centrifugally controlled means for shifting the pressure ring into clutch engagement with the driven disk, said ring, plate and centrifugal means being carried by the cover plate, and operator controlled means for shifting said ring, plate and centrifugal means for disengaging and engaging the clutch independently of centrifugal action.

3. A clutch comprising in combination, a flywheel or the like, a driven disk, a clutch cover adapted to be secured to the flywheel, a carrier plate within the cover, a pressure ring also within the cover, centrifugally controlled means associated with the carrier plate and pressure ring, packing springs between portions of the cover and carrier plate, said carrier plate, centrifugal means and pressure ring all being carried by the cover, said centrifugal means serving to shift the pressure ring incident to centrifugal action for engaging and releasing the driven member, and operator controlled means for shifting the carrier plate, centrifugal means and pressure ring to control clutch engagement and release at will.

4. A clutch comprising in combination, a flywheel or the like, a driven disk, a clutch cover adapted to be secured to the flywheel, a carrier plate within the cover, a pressure ring also within the cover, centrifugally controlled means associated with the carrier plate and pressure ring, packing springs between portions of the cover and carrier plate, said carrier plate, centrifugal means and pressure ring all being carried by the cover, said centrifugal means serving to shift the pressure ring incident to centrifugal action for engaging and releasing the driven member, and operator controlled means acting upon the carrier plate for shifting the carrier plate, centrifugal means and pressure ring to control clutch engagement and release at will.

5. A clutch comprising in combination, a flywheel or the like, a driven disk, a cover plate adapted to be attached to the flywheel, a carrier plate, a pressure ring, centrifugally actuated means associated with the pressure ring and carrier plate, packing springs for urging the carrier plate, pressure ring and centrifugal means toward the driven disk, means for limiting the movement of the said parts toward the driven disk for maintaining the clutch disengaged when the said centrifugal means is ineffective, said centrifugal means shifting the pressure ring into engagement with the driven disk upon sufficient centrifugal action, means for limiting the action of the centrifugal means in shifting the pressure plate, means associating the carrier plate, centrifugal means and pressure ring together as a unit, said first mentioned limiting means including operator actuated clutch releasing levers associated with the carrier plate and actuatable to shift the carrier plate, centrifugal means and pressure ring to control clutch engagement and release independently of centrifugal action.

6. A clutch comprising in combination with a driven disk, a flywheel or the like on one side of the disk, a cover plate secured to the flywheel, means within the cover plate and carried thereby, comprising a carrier plate, centrifugally controlled means and pressure ring all located on the side of the driven disk opposite the flywheel, means for shifting the pressure ring axially to pack the driven member between the pressure ring and flywheel upon actuation of the centrifugally controlled means, and operator controlled means for shifting the carrier plate, centrifugally controlled means and pressure ring to control clutch release and engagement at will.

7. In a clutch, a clutch cover, a carrier plate, a clutch pressure ring, a plurality of centrifugally controlled elements between the ring and plate having a limited range of radial shift, means tying the ring, the elements and the plate together arranged to permit the ring and plate to shift axially relative to each other and to permit the centrifugal elements to shift radially, inclined plane means for effecting said relative axial shift as the said elements shift incident to centrifugal action, operator controlled means for shifting the plate, centrifugal elements, and pressure ring relative to the cover, and means connecting the pressure ring in driving relation with the cover.

8. In a clutch, a clutch cover, a pressure ring, a carrier plate, radially shiftable centrifugally controlled elements between the ring and plate, said elements, ring and plate having matching recesses with inclined walls, a ball pocketed in each pair of matched recesses, means tying the ring, elements and plate together including spring elements for permitting relative axial shift of the ring and plate, said balls and inclined plane means effecting such relative axial shift upon radial shift of said elements incident to centrifugal action, and means for shifting the plate, the elements and the ring relative to the cover at the will of an operator.

9. In a clutch, a cover plate adapted to be attached to a flywheel or the like, a carrier plate, a pressure ring, radially movable centrifugally controlled elements between the ring and plate, inclined plane means associated with the radially movable elements, studs passing through the ring, elements and plate, a spring associated with each stud for tying the said parts together, said elements having elongated apertures for movement radially relative to the studs, said elements moving radially outwardly incident to centrifugal action and serving to shift the pressure ring and cover plate relatively axially through said inclined plane means, said studs serving to limit the radially outward movement of said elements, and packing springs acting upon the carrier plate.

10. In a clutch, a cover plate adapted to be attached to a flywheel or the like, a carrier plate, a pressure ring, radially movable centrifugally controlled elements between the ring and plate, inclined plane means associated with the radially movable elements, studs passing through the ring, elements and plate, a spring associated with each stud for tying the said parts together, said elements having elongated apertures for movement radially relative to the studs, said elements moving radially outwardly incident to centrifugal action and serving to shift the pressure ring and cover plate relatively axially through said inclined plane means, said studs serving to limit the radially outward movement of said elements, packing springs acting upon the carrier plate, and operator controlled means for shifting the plate, centrifugally controlled elements and pressure ring relative to the cover plate against the action of the packing springs.

11. A driving member assembly of a centrifugally controlled clutch for association with a driven disk and a second driving member, comprising a cover plate, a carrier plate, a pressure ring disposed in driving relation with the cover plate, a plurality of substantially segmental members disposed between the pressure ring and carrier plate, means resiliently holding the pressure ring, elements and carrier plate together as an assembled unit, each element having circumferentially spaced recesses in one face and radially spaced recesses in its other face, the ring and plate having recesses for matching those in the elements, said recesses having inclined walls, and a ball member pocketed in the matched recesses.

12. A driving member of a centrifugally controlled clutch for association with a driven disk and a second driving member, comprising a cover plate, a carrier plate, a pressure ring disposed in driving relation with the cover plate, a plurality of substantially segmental members disposed between the pressure ring and carrier plate, means resiliently holding the pressure ring, elements and carrier plate together as an assembled unit, each element having circumferentially spaced recesses in one face and radially spaced recesses in its other face, the ring and plate having recesses for matching those in the elements, said recesses having inclined walls, a ball member pocketed in each pair of matched recesses, the arrangement of the matching recesses and ball members being such as to provide a four-point engagement of each centrifugally actuated member with the pressure ring and carrier plate.

13. In a centrifugally controlled clutch, a carrier plate, a pressure ring, a plurality of radially shiftable centrifugally controlled elements between the ring and plate, inclined plane means on one side of each element spaced circumferentially, inclined plane means on the opposite side of each element spaced radially, said inclined plane means providing a four-point contact for each element with the pressure ring and carrier plate.

14. A clutch comprising a driving member, a driven disk, a second driving member, said second driving member including elements shiftable by centrifugal action for effecting engagement and release of the driven member, clutch releasing devices movable with the engagement and disengagement of the clutch by centrifugal action, a shiftable operator controlled device for acting upon the movable clutch release means, and filler means shiftable automatically into and out of position between the said devices and clutch-releasing means incident to rotation of the parts for varying the clearance between said clutch-releasing means and said device.

15. A clutch comprising in combination, a driving member, a driven disk and a second driving member, said second driving member including elements shiftable by centrifugal action for engaging and releasing the clutching action, movable clutch releasing devices which move upon clutch release and engagement by centrifugal action, an operator controlled shiftable device for acting upon the clutch release devices for controlling the clutch independently of centrifugal action, and centrifugally controlled means movable into and out of position between the said shiftable devices and clutch releasing device.

16. In a clutch, a driving member, a driven disk, a second driving member, clutch releasing levers associated with the second driving member, an operator controlled shiftable device for acting upon the levers, centrifugally controlled means for effecting clutch engagement and disengagement for centrifugal action, said clutch releasing levers being arranged to move in such clutch engagement and disengagement with the movement being away from the operator controlled device when the clutch is engaged centrifugally, centrifugally controlled filler means movable by centrifugal action into the space between the said device and levers, and movable out of said space substantially in the absence of centrifugal action whereby the levers may shift into closer relationship with said device when the parts are not rotating.

17. A clutch comprising in combination, a driving member, a driven disk, a clutch cover, a second driving member, packing springs for urging the second driving member toward the driven disk, centrifugally controlled means for limiting the said movement toward the driven disk to maintain the clutch normally disengaged, centrifugal means associated with the second driving member for shifting the same incident to centrifugal action and engaging the clutch and shiftable upon lowering of centrifugal action to disengage the clutch, clutch releasing levers associated with the second driving member which rock in clutch engagement and disengagement, an operator controlled clutch releasing device for acting upon the levers, said centrifugally controlled stop means being shiftable out of stopping position in the absence of substantially centrifugal action whereby to permit the springs to engage the clutch in the absence of centrifugal action, and centrifugally controlled means shiftable into a position between the operator controlled device and levers in the presence of centrifugal action and shiftable out of position between said device and levers substantially in the absence of centrifugal action whereby to permit said levers to move toward said device for clutch engagement in the absence of centrifugal action.

18. A clutch comprsing in combination, driving and driven clutch members, clutch releasing levers, a manually shiftable clutch releasing device for acting upon the levers, centrifugal means for engaging and disengaging the clutch by centrifugal action whereby the clutch-releasing levers actuate in such action, and centrifugally controlled filler members shiftable by centrifugal action into a position between the levers and said device when said levers shift away from said device whereby to maintain a substantially normal operative relation between said device and levers 19. A clutch comprising in combination, driving and driven clutch members, clutch releasing levers, a manually shiftable clutch releasing device for acting upon the levers, centrifugal means for engaging and disengaging the clutch by centrifugal action whereby the clutch-releasing levers actuate in such action, and centrifugally controlled filler members shiftable by centrifugal action into a position between the levers and said device when said levers shift away from said device whereby to maintain a substantially normal operative relation between said device and levers, said filler members being shiftable out of said position substantially in the absence of centrifugal action whereby to permit the levers to shift toward said device for clutch engagement in the absence of centrifugal action.

20. A clutch controllable by centrifugal action and by physical effort of an operator comprising, driving and driven members, clutch releasing levers, a manually shiftable clutch releasing device for acting upon the levers, centrifugally controlled means for controlling the clutch in which action the releasing levers shift toward and away from the manually shiftable device, and centrifugally actuated filler means shiftable into a position between the levers and manually shiftable device as the levers move away from said device, and shiftable out of said position in the absence of substantial centrifugal action whereby to permit the levers to move into close relationship with said device.

21. A clutch comprising, driving and driven members, clutch-releasing levers, centrifugal means for engaging and releasing the clutch by centrifugal action, said levers being associated with the clutch whereby to rock as the clutch is engaged and disengaged, a manually shiftable clutch releasing element having substantially a given amount of movement away from which the levers rock in the presence of centrifugal action and towards which the levers rock in the absence of centrifugal action, and centrifugally controlled filler means shiftable into a position between the levers and said device when the levers move away from said device for maintaining a relatively close operative association between the levers and said device.

22. A clutch comprising in combination, a driven member, a driving member for engaging the driven member on one side, a driving member for engaging the driven member on its opposite side, centrifugally controlled members associated with the second driving member, means interrelated with the centrifugally controlled members and second driving member for shifting the second driving member axially into engagement with the driven member when the centrifugally controlled members are shifted by centrifugal action, packing springs adapted to be stressed when the centrifugal member urges the second driving member into engagement with the driven member, and operator controlled means for shifting the second driving member and the centrifugal members axially to release the clutch by movement against the action of the packing springs without shifting the centrifugal members out of the position they are caused to assume by centrifugal action.

23. A clutch comprising in combination, a driven member, a driving member for engaging the driven member on one side, a driving member for engaging the driven member on the other side, a carrier plate, centrifugally controlled members between the second driving member and carrier plate, said centrifugally controlled members shifting radially outwardly and inwardly incident to centrifugal action, packing springs adapted to urge the carrier plate, the centrifugal members, and the second driving member axially toward the driven member, means effective for shifting the second driving member axially into engagement with the driven member upon shift of the centrifugally controlled members incident to centrifugal action, and operator controlled means for shifting the second driving member, the centrifugally controlled members, and the carrier plate bodily as a unit, to disengage the second driving member from the driven member without shifting the centrifugally controlled members against the effective centrifugal force.

24. A clutch of the type having driving members and a driven member arranged to be packed between the driving members, comprising in combination a rotary driving member on one side of the driven member, a driving member on the opposite side of the driven member a cover plate attached to the first driving member and extending over the opposite side of the driven member, centrifugally controlled elements within the cover plate arranged to shift by centrifugal action and for urging the second driving member into packing relation with the driven member, and operator controlled means for shifting the centrifugally controlled elements and second driving member axially away from the driven member independently of the position of the centrifugally controlled elements as determined by centrifugal force for releasing the clutch.

25. A clutch comprising in combination with a driven disk, a flywheel or the like disposed on one side of the disk, a cover plate attached to the flywheel, a pressure plate within the cover plate and on the opposite side of the driven disk from the flywheel, centrifugally controlled elements within the cover plate shiftable by centrifugal action to move the pressure plate toward the driven disk whereby the same is packed between the flywheel and pressure plate, stop means for limiting the movement of the said elements by centrifugal action and operator controlled means for shifting the pressure plate and centrifugally controlled elements bodily as a unit for releasing the clutch when so engaged by centrifugal action.

26. A clutch comprising in combination with a driven disk, a flywheel or the like disposed on one side of the disk, a cover plate attached to the flywheel, a pressure plate within the cover plate and on the side of the driven disk opposite the flywheel, centrifugally controlled elements within the cover plate, said elements being shiftable through a definite limited range of movement by centrifugal action to move the pressure plate into engagement with the driven disk, packing springs backed up by the cover plate which take the reaction force when the pressure plate is packed against the driven disk, and operator controlled means for retracting the pressure plate and centrifugal elements bodily as a unit away from the driven disk and against the action of said springs to release the clutch.

27. A clutch comprising in combination with a driven disk, a flywheel or the like disposed on one side of the disk, a cover plate attached to the flywheel, a pressure plate on the side of the driven disk opposite the flywheel centrifugally controlled elements shiftable through a definite limited range of movement by centrifugal action to move the pressure plate into packing relation with the driven disk, packing springs reacting against the cover plate and exerting clutch packing pressure against the driven disk, operator controlled means for shifting the pressure plate and centrifugal elements bodily away from the driven disk against the action of the springs to release the clutch, and arranged to limit the action of the packing springs whereby the driven disk may be disengaged upon decrease of centrifugal action.

28. In a clutch, a clutch cover plate, a carrier plate within the cover, a clutch pressure ring, a plurality of radially shiftable centrifugally controlled weights located between the ring and plate, means tying the ring, centrifugal weights and plate together for movement bodily as a unit and arranged to permit the centrifugal weights to shift radially incident to centrifugal action, inclined plane means associated with the centrifugal weights arranged to shift the pressure ring axially to engage the clutch, and operator controlled means for shifting the centrifugal weights and carrier plate bodily as a unit to disengage the clutch.

29. In a clutch, a clutch cover plate, a carrier plate within the cover, a clutch pressure ring, a plurality of centrifugally controlled elements between the ring and plate, means tying the ring, centrifugal elements and plate together for movement bodily as a unit and arranged to permit the centrifugal means to shift radially incident to centrifugal action, the centrifugal means having a definitely limited range of radial shift, inclined plane means associated with the centrifugal means arranged to shift the pressure ring axially to engage the clutch, means uniting the pressure ring in driving relation with the cover and operator controlled means for shifting the centrifugal elements and carrier plate bodily as a unit to disengage the clutch.

30. In a clutch, a clutch cover, a carrier plate, a clutch pressure ring axially spaced from the carrier plate, a plurality of centrifugally controlled elements lying between the ring and plate, means tying the ring, the elements and the plate together arranged to permit the ring and plate to shift axially relative to each other and to permit the centrifugal elements to shift radially in said space, the centrifugal elements being limited in their radially outward movement, inclined plane means through which the centrifugal elements act for effecting said relative axial shift as the said elements shift radially incident to centrifugal action, and operator controlled means for shifting the plate, centrifugal elements, and pressure ring relative to the cover.

31. In combination, a driving member; a driven member; speed responsive means for causing said driving member to engage said driven member when said driving member reaches a predetermined speed; a reaction member against which said speed responsive means react; spring means, comprising a plurality of compression springs circularly disposed about the periphery of, and acting directly against said reaction member, for resisting movement of said reaction member in response to the operation of said speed responsive means; and means for withdrawing said driving member and said reaction member from said driven member for declutching purposes.

32. The combination set forth in claim 31 wherein said driving member and said reaction member are urged together by resilient means.

33. In a clutch mechanism, a driving member; an automatic plate mounted for rotation with said driving member and for movement axially thereof for clutching and declutching purposes; a driven member disposed between said driving member and said automatic plate and adapted to be clamped therebetween; a reaction plate having resilient backing means urging the same toward said automatic plate and said driven member, said reaction plate being mounted for rotation with said driving member and for movement axially thereof; holding means connected to said reaction plate for normally preventing said resilient backing means from forcing said automatic plate into engagement with said driven member centrifugally operable means for forcing said automatic plate and said reaction plate away from each other to thereby cause said automatic plate to engage said driven member when said driving member reaches a predetermined speed; and means for moving said automatic plate and said reaction plate away from said driven member for declutching purposes, said holding means being operable to release said reaction plate to allow said resilient backing means to force said automatic plate and said driven member into engagement.

34. In combination, a driving member; an automatic plate mounted for rotation with said driving member and for movement axially thereof for clutching and declutching movements; a driven member disposed between said driving member and said automatic plate adapted to be clamped therebetween; a resiliently backed reaction plate mounted for rotation with said driving member and for movement axially thereof and having resilient means urging the same toward said automatic plate and said driven member; spring means urging said automatic plate and reaction plate toward each other; centrifugally operable means for forcing said automatic plate and reaction plate away from each other against the action of said spring means to thereby cause said automatic plate to engage said driven member when said driving member reaches a predetermined speed; and means for permitting said resilient means to bring said automatic plate into engagement with said driven member.

35. In combination with the flywheel of a conventional automotive vehicle, a driving member; an automatic plate mounted for rotation with said driving member and for movement axially thereof for clutching and declutching movements; a driven member disposed between said driving member and said automatic plate adapted to be clamped therebetween; a resiliently backed reaction plate mounted for rotation with said driving member and for movement axially thereof; spring means urging said automatic plate and reaction plate toward each other; centrifugally operable means for forcing said automatic plate and reaction plate away from each other against the action of said spring means to thereby cause said automatic plate to engage and drive said driven member when said driving member reaches a predetermined speed, and means for moving said automatic and reaction plates and said centrifugally operable means axially toward and from said driven member.

36. In combination, a clutch mechanism adapted for operative assembly and removal as a unit with relation to the driving face of the conventional automotive flywheel comprising a driven member adapted to engage said driving face; an automatic plate adapted to be driven by said flywheel and to force said driven member into engagement with said driving face; a resiliently backed reaction member; centrifugal means adapted to be driven by said flywheel reacting against said reaction member to actuate said automatic plate to force said driven member against said driving face at predetermined speeds; and manually operable means for actuating said automatic plate and said reaction member to cause disengagement of said driven member and said driving face for declutching purposes.

37. In combination, a flywheel having a driving face; a driven member adapted to engage said driving face; an automatic plate driven by said flywheel and adapted to force said driven member into engagement with said driving face; a resiliently backed reaction member; centrifugal means driven by said flywheel and reacting against said reaction member and adapted to actuate said automatic plate and force said driven member against said driving face when the flywheel speed reaches a predetermined value; and manually operable means for actuating said automatic plate and said reaction member to cause engagement and disengagement of said driven member and said driving face.

38. In a clutch mechanism, driving and driven members mounted for engagement and disengagement; a reaction element mounted for axial movement; speed responsive means adapted to apply active forces to one of said members and reactive forces to said reaction element, and force said members into frictional engagement when one of said members attains a predetermined speed; means for moving said reaction element so as to maintain said members disengaged irrespective of any engaging tendencies which may be manifested by said speed responsive means; and means for moving said reaction element so as to maintain said members engaged at all speeds.

39. In a clutch mechanism, driving and driven members mounted for engagement and disengagement; an axially movable reaction element; speed responsive means adapted to act against one of said members and react against said reaction element, for forcing said members into engagement when one of said members attains a predetermined speed; resilient means acting upon said reaction element and tending to urge said members into engagement; and means for maintaining said members disengaged against the action of said resilient means when said one member is rotating below said predetermined speed, said last named means being operable to allow said resilient means to bring said members into engagement, either independently of, or concurrently with actuation of said speed responsive means.

ERNEST E. WEMP.